(12) United States Patent
Hsiao

(10) Patent No.: US 6,213,908 B1
(45) Date of Patent: Apr. 10, 2001

(54) GEAR TYPE AUTOMATED TORQUE CONVERTER

(76) Inventor: Hao Pang Hsiao, 1F, No. 125, Shuang Feng Rd., Shuang Hsi Tsun, Pao Shan Hsiang, Hsinchu (TW)

( * ) Notice: Subject to any disclaimer, the term of this patent is extended or adjusted under 35 U.S.C. 154(b) by 0 days.

(21) Appl. No.: 09/361,000

(22) Filed: Jul. 27, 1999

(51) Int. Cl.$^7$ ........................................ F16H 3/74
(52) U.S. Cl. .................................. 475/221; 475/254
(58) Field of Search ................................. 475/221, 204, 475/230, 257, 330, 336, 254

(56) References Cited

U.S. PATENT DOCUMENTS

| | | | |
|---|---|---|---|
| 2,480,032 | * 8/1949 | Kochis | 475/53 |
| 3,318,172 | * 5/1967 | Cummins | 475/254 |
| 4,077,278 | * 3/1978 | Combastet | 475/330 |
| 4,235,125 | * 11/1980 | Perlin | 475/254 |
| 4,598,610 | * 7/1986 | Kim | 475/330 |
| 4,854,190 | * 8/1989 | Won | 475/5 |
| 5,456,640 | * 10/1995 | Peterson | 475/330 |

* cited by examiner

Primary Examiner—Charles A. Marmor
Assistant Examiner—Ankur Parekh
(74) Attorney, Agent, or Firm—Rosenberg, Klein & Lee

(57) ABSTRACT

A gear type automated torque converter used to provide a continuously variable minimum torque required in a transmission system subject to the changing of the loading is provided. The gear type automated torque converter includes a torque changing main unit formed of a drive gear set to receive an input power, the drive gear set including a differential gear system, a left gear at the left side, and a right gear at the right side; and a feedback gear mechanism formed of a plurality of feedback gear sets arranged in pair in force couples, the feedback gear sets each including a differential gear system, a left gear at the left side, and a right gear at the right side, the output rotational speed of the feedback gear mechanism and the input rotational speed of the torque changing main unit are equal, enabling the power at the feedback gear mechanism be fed back to the torque main unit through a converter.

4 Claims, 7 Drawing Sheets

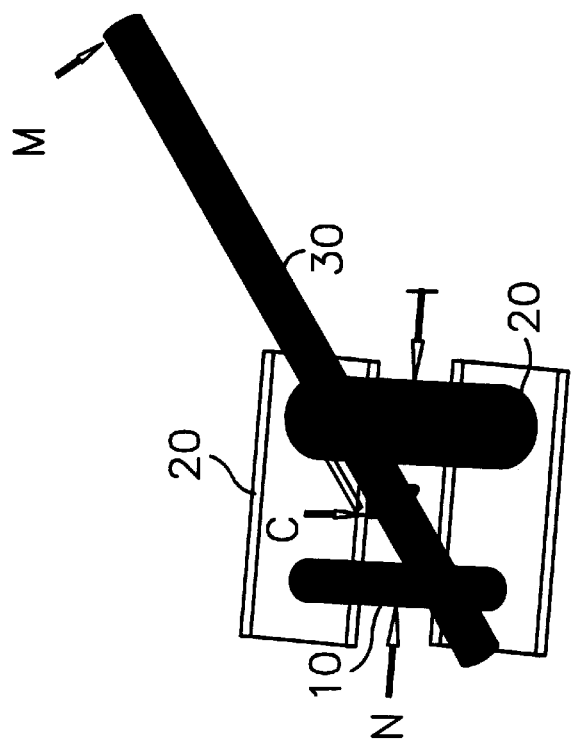
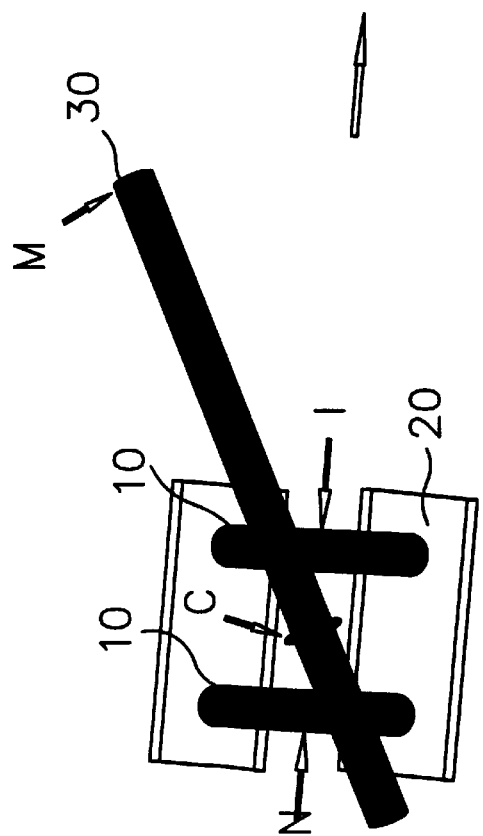

GEAR TYPE AUTOMATED TORQUE CONVERTER

BACKGROUND OF THE INVENTION

The present invention relates to a gear type automated torque converter which provides a continuously variable minimum torque required in a transmission system subject to changing of the loading.

Regular gear shifting systems are complicated, and require a precision torque converter. When changing the gear shifting position, a vibration will be generated. Furthermore, the timing of the gear shifting must be decided through a precise and sensitive detection and calculation means. A friction type speed changing system achieves high performance, however it can only be used for small loading. There are also known differential gear type speed changing systems, however these systems are for simple use only. The conventional type of speed changing mechanism includes non-stepped speed changing systems and stepped speed changing systems, as outlined hereinafter.

a. In a stepped speed changing system, the system operation, in which the required torsion and loading is provided by means of several speed ratios, is divided into several parts. Because the speed ratio between each two parts of the system operation is not changeable, change of torsion during the system operation is controlled by the engine. To accommodate this, the structure of the engine becomes very complicated. The decision of the time where the speed of revolution is to be changed must be made through a precise and sensitive detection and calculation device. Such a precise and sensitive detection and calculation device is expensive.

b. Most conventional non-stepped speed changing systems are of a friction design. There are also known magnetic force type non-stepped speed changing systems, as well. However, using frictional force or magnetic force can only produce a limited torque. Therefore, these non-stepped speed changing systems can only be used in small scale transmission systems. These non-stepped speed changing systems achieve high performance, however they need detecting elements to determine rotational speed. These detecting elements complicate the structure of the system.

SUMMARY OF THE INVENTION

It is one object of the present invention to provide a gear type automated torque converter which automatically determines the minimum torque required in a transmission system for the desired speed when the transmission system bears a variable resistance. It is another object of the present invention to provide a gear type automated torque converter which uses a highly stable gear mechanism to achieve automatic changing of output torque without the assistance of detecting elements. It is still another object of the present invention to provide a gear type automated torque converter which saves power. The gear type automated torque converter maintains a fixed slip ratio between the speed of the power input shaft and the output speed of the feedback unit. This feature fits the converter's performance curve, i.e., high performance is achieved under a fixed slip ratio. It is still another object of the present invention to provide a simple and effective rule and calculation method which determines the characteristics of the gear mechanism and the number of feedback levels, enabling a balance point to be obtained between system complicacy and the amount of feedback power required. It is still another object of the present invention to provide a gear type automated torque converter which simplifies the design and fabrication of the power source (engine). The power output characteristic of the gear type automated torque converter is independent of the characteristic of the engine. Either a complicated or simple engine can drive the gear type automated torque converter to provide the desired output of the same horse power. It is still another object of the present invention to provide a gear transmission mechanism which achieves the same multiplication and power gain as equivalent electronic circuit means, enabling mechanical mechanism designers to design a variety of products having a variable output.

BRIEF DESCRIPTION OF THE DRAWINGS

FIGS. 4A and 4B are diagrams explaining the basic principle of the present invention.

DETAILED DESCRIPTION OF THE PREFERRED EMBODIMENT

A gear type automated torque converter in accordance with the present invention is generally comprised of a main unit and a feed back unit.

A. Main Unit

The main transmission structure of the main unit is similar to the differential gear of the rear axle of an automobile, with the exception of the input and output positions. From the following explanation of schematic diagram of the system and leverage diagrams, the achievement of this simple gear structure in a non-stepped speed changing and torque converting apparatus will be well understood.

Figure 1:
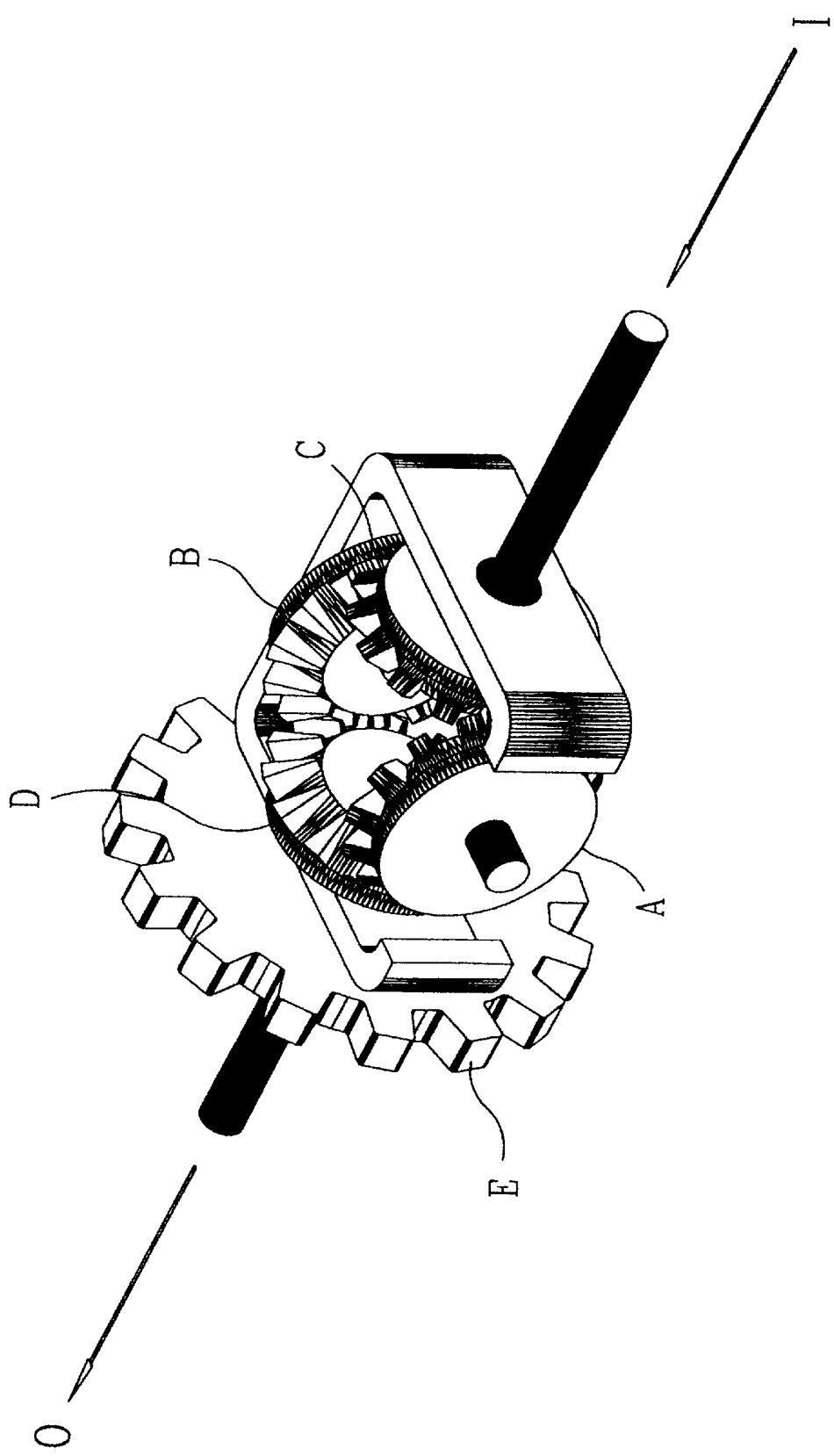
FIG. 1 illustrates the characteristic of a differential gear system according to the present invention.

FIG. 1 illustrates the characteristics of a differential gear according to the present invention. The differential gear system comprises a power input shaft I, a power output shaft O, a gear A, which is analyzed in FIG. 2, a gear B, which works with gear A to produce a differential motion and distributes torsion to a gear C and the gear box, the gear C, which is fixedly mounted on power input shaft I, a gear D to which power output shaft O is connected, and a power output gear E, which is fixedly fastened to gear box for output of torque. The torque at the output end is equal to the minimum torque required for output of the differential gear system.

Figure 2:
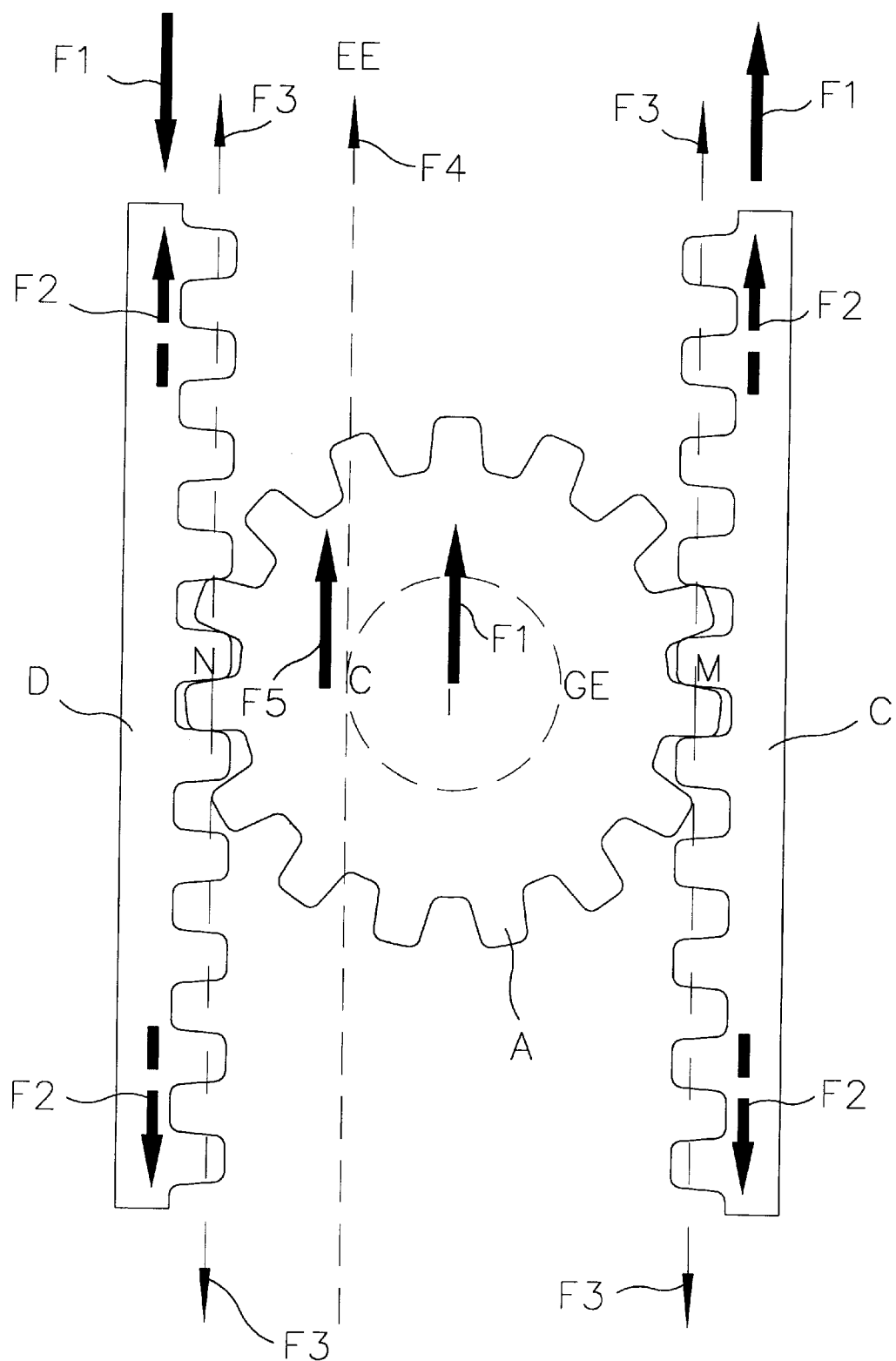
FIG. 2 is a schematic drawing of the main unit of the differential gear system according to the present invention.

FIG. 2 is a schematic drawing of the main unit of the aforesaid differential gear system. The solid arrowhead sign "F1" indicates the direction of movement of gear A, rack C, rack D and fulcrum "C". The gear A, rack C and rack D shown in FIG. 2 correspond to gear A, gear C and gear D shown in FIG. 1. The sign "I" indicates the center of gear A. The broken arrowhead sign "F2" indicates indefinite extension of rack C and rack D in two opposing directions. Because no end is seen when a circular gear is rotated in one direction, top and bottom ends of rack C and rack D extend indefinitely upwards and downwards when gear C and gear D of FIG. 1 are projected into the plan view of FIG. 2. The dotted line F3 indicates the locus of contact point between rack C and gear A, and rack D and gear A. The sign "M" indicates the real time contact point between rack C and gear A. The sign "N" indicates the real time contact point between rack D and gear A. The dotted line F4 "EE" indicates the track line of fulcrum "C" during the operation of the mechanism in space. The dotted line "GE" indicates the track line of fulcrum "C" on gear A. The arrowhead sign "F5" indicates the direction of movement of fulcrum "C".

When comparing FIG. 1 with FIG. 2, several additional lines are found in FIG. 2. These lines are imaginary lines of imaginary racks and an imaginary gear. The size and positions of the imaginary gear and racks can be changed without a step. Actually, a gear and racks with this kind of performance do not exist. But the phenomena of changes in magnitude and position without steps exists. For easy understanding of the present invention, the schematic diagram is employed to explain the non-stepped size and position change of the gear and racks.

Figure 3A:
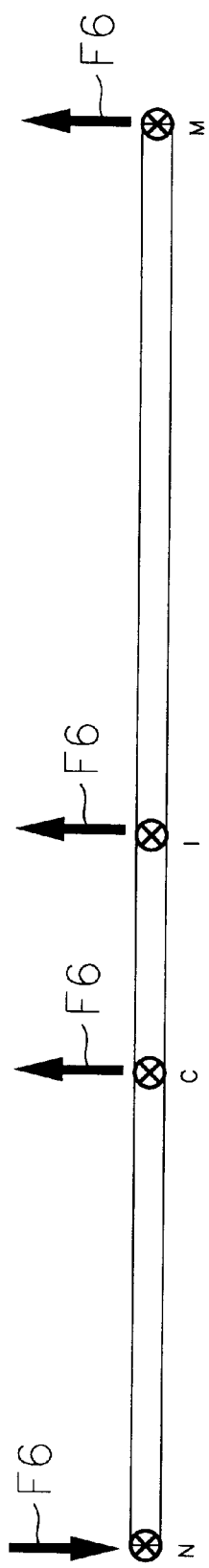
FIG. 3A is a leverage diagram indicating the direction of movement of the point of application according to the present invention.
Figure 3B:
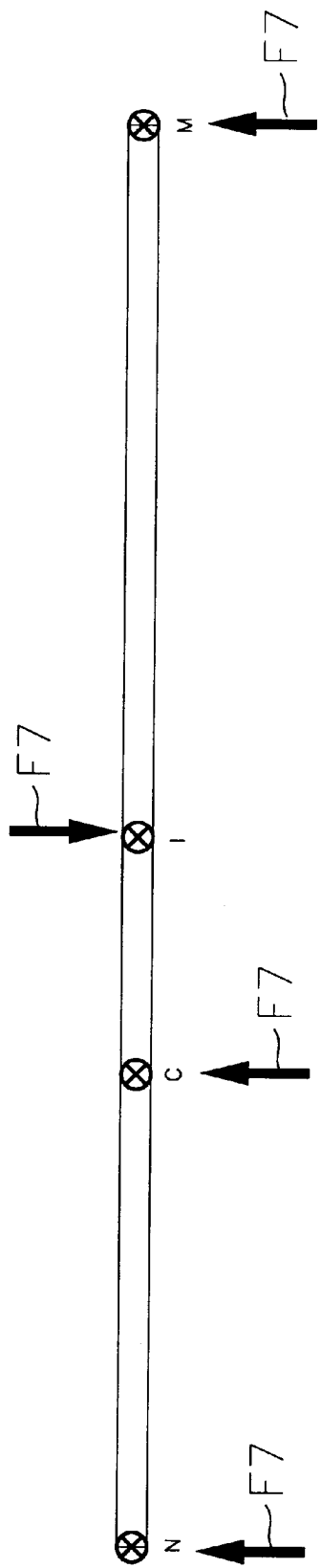
FIG. 3B is a leverage diagram indicating the direction of force received at the point application according to the present invention.

FIGS. 3A and 3B are leverage diagrams obtained from FIG. 2. FIG. 3A indicates the direction of movement of the point of force application. FIG. 3B indicates the direction of the force received at the point of force application. The direction of movement of the point of action is referenced by F6. The direction of force received at the point of action is referenced by F7.

Before understanding the principle of the gear type automated torque converter, a basic concept must be understood. FIG. 4A illustrates two parallel iron rods 10 of the same rigidity fixedly connected to a rigid member 20, and a steel bar 30 inserted between the iron rods 10 and a force applied to deform the iron rods 10. When a force is applied to point "M" at the steel bar 30, the bearing point is at point "I" and point "N". If the two iron rods 10 have same diameter and rigidity, the fulcrum is at the center point "C" between the two iron rods 10. If the diameter and rigidity of the two iron rods 10 are changed, the position of "C" is relatively changed (see FIG. 4B). This is the basic principle of a floating fulcrum.

Assume an indefinite number of steel bars are continuously acted at point "C", thus the imaginary line "EE" of FIG. 2 can be regarded as the track line of fulcrum "C" in space, and "GE" can be regarded as the track line of point "C" at gear A. The other points in FIG. 2 are same as that shown in FIG. 1. When "EE" is rack D and "GE" is gear A, the structure is same as concentric gear A. At this time, point "N" is suspended in the air, i.e., point "N" receives no force (because force is applied to fulcrum "C"). If a loading is placed on point "N", the loading gradually distributes the contact force between "GE" and "EE" until no force is received between "GE" and "EE". When no force is received between "GE" and "EE", removing "EE" does not affect the movement of the mechanism. At this time, fulcrum "C" is not at any bearing point, however the mechanism keeps running, thus the concept of floating fulcrum is well explained.

Therefore, when a proper loading is given to point "N", it forms with "M" a force couple, achieving a non-stepped, accurate (not friction type) speed changing effect. However, the transmission efficiency is low at this time because one half of the power was given to "N". In order to improve the transmission efficiency, the loading at "N" must be fed back to the main power.

B. Feed Back Unit

Figures 5A, 5B:
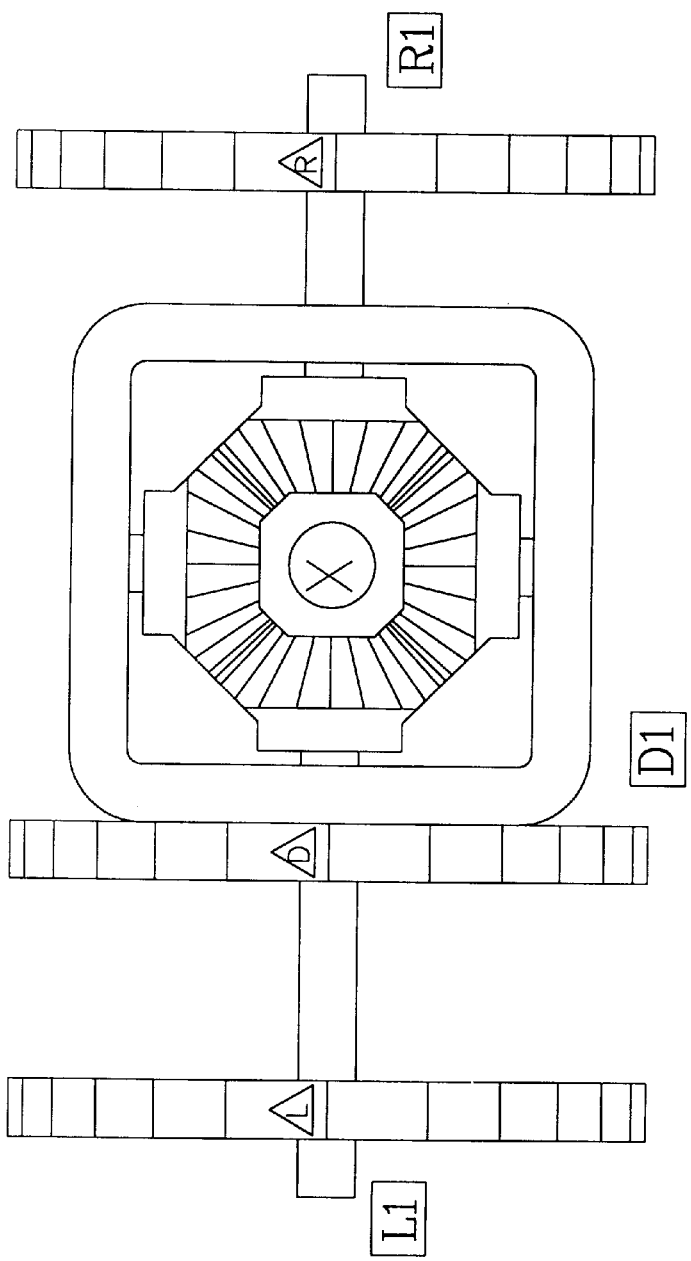
FIGS. 5A and 5B illustrate the basic elements of the differential gear feed back unit according to the present invention.

FIG. 5A illustrates the basic elements of the differential gear feed back mechanism. FIG. 5B illustrates a spur gear. The feed back unit consists of a differential gear system and a spur gear. In FIG. 5A, X indicates a differential gear system; L indicates a left-side gear; R indicates a right-side gear; D indicates a differential gear. L1, R1 and D1 represent the value of an output or input ratio of torque distributed to the left-side gear, the right-side gear and the differential gear.

Figure 6:
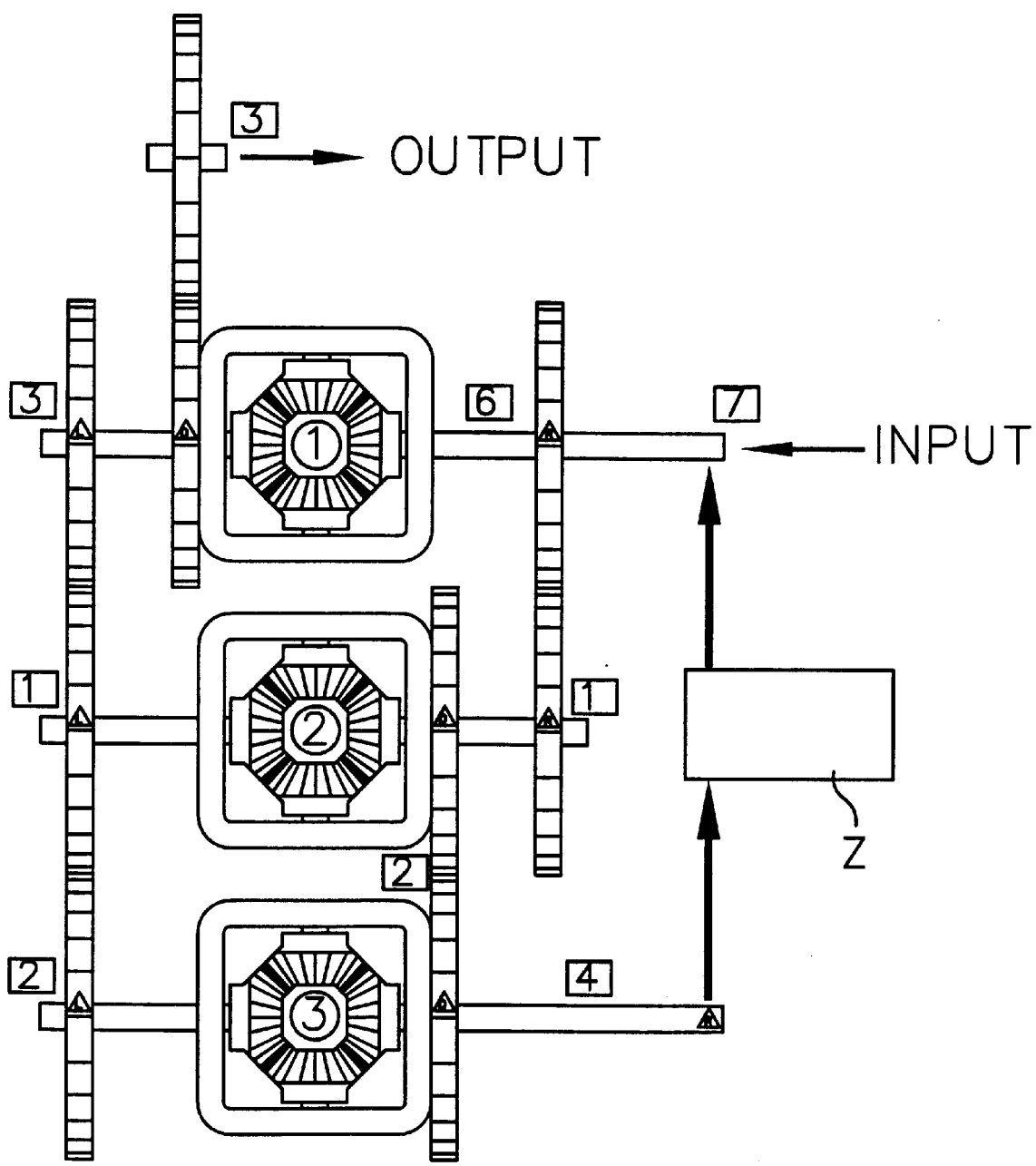
FIG. 6 illustrates a single-set feedback unit according to the present invention.
Figure 7:
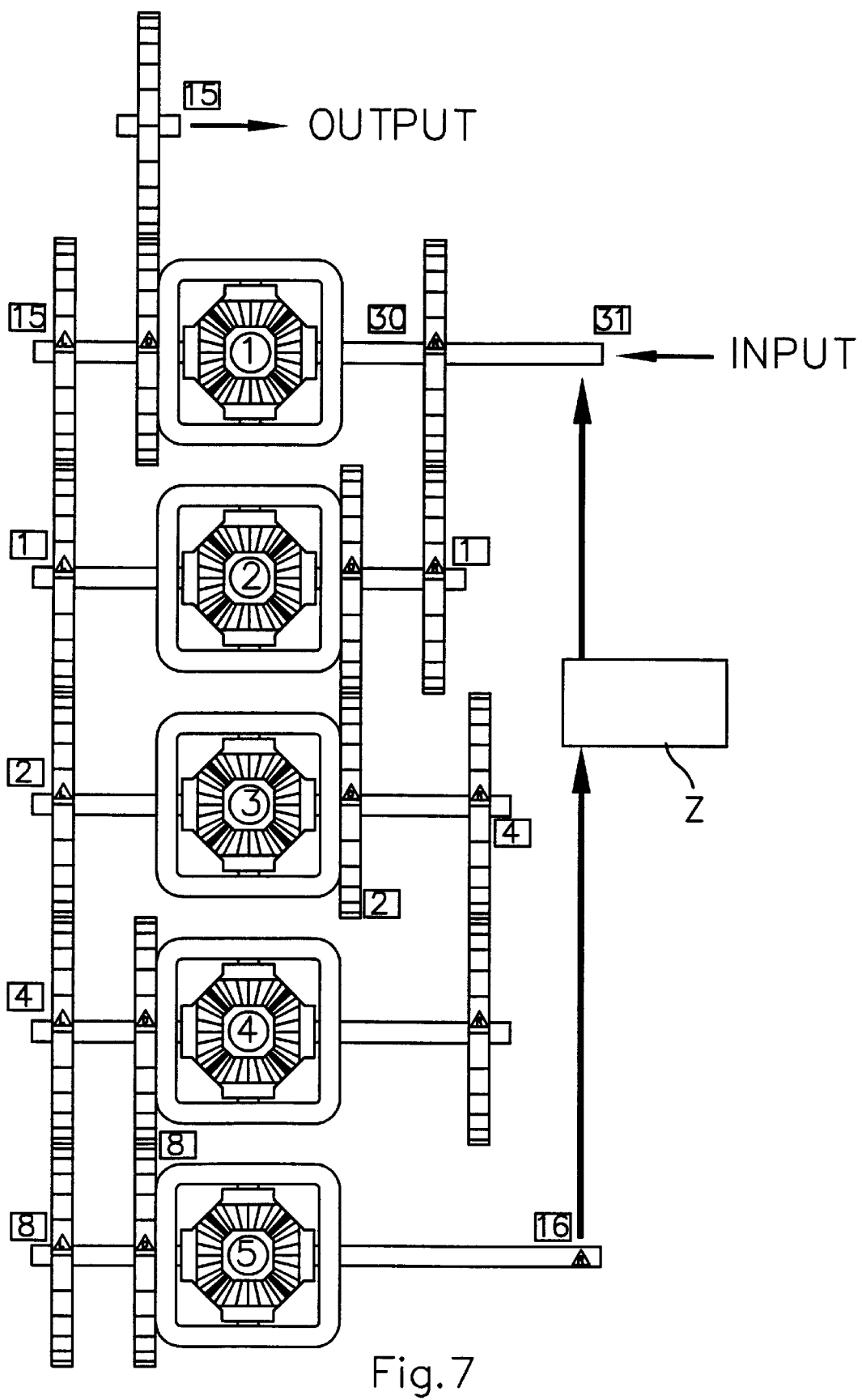
FIG. 7 illustrates a double-set feedback unit according to the present invention.

FIG. 6 illustrates the characteristic of the single set differential gear type feed back unit. In the drawing, the differential gear system referenced by "1" is the main drive gear, the differential gear systems referenced by "2" and "3" are the feed back gear set. In a single feed back circulation, 1/7 of total power must be input to gear R of the differential gear "2", so that 3/7 of the torque of gear L of the differential gear "1" and the 1/7 of its torque can be fed back to the input end through a coupler Z.

a. Before introducing feedback unit, the following rules and procedures must be well understood:

a-1, the same torque must exist in a pair of forces forming force couple where there is no fixed fulcrum.

a-2, when two different torques are applied to a differential gear system, the greater torque can only provide an output equal to that of the smaller torque, to form a force couple.

a-3, when two torques are input to either of two gears of a differential gear system, the third gear of the differential gear system outputs a torque which is two times the torque of the smaller input torque.

a-4, the residual torque left after application of the greater input torque and the output torque obtained from a-3 are transmitted to two gears at a "relative position" of the next differential gear system, to form a torque multiplying effect like a-3 (using "relative position" to transmit torque can easily obtain a consistent rotating speed relative to the input end, so as to facilitate feed back operation).

a-5, the actions of a-3 and a-4 are repeated until a satisfactory torque is achieved.

a-6, a converter is used to feed back the torque obtained from a-5, to the power input end.

a-7, any type of diffential gear system and planetary gear system fit the design from a-1 to a-6.

b. From the rules and procedures of a, the feedback unit can be understood. In a converter (hydraulic converter, magnetic converter, or friction converter), if the differential ratio is maintained at a fixed value, the transmission efficiency reaches the maximum level. The principal of the present invention is to maintain the rotational feedback speed and the rotational speed of the power input end at a fixed differential ratio. Therefore, a force received at point "N" in FIGS. 4A, 4B can be responded to at the power input end by a proper torque, so as to achieve a highly efficient power circulation.

c. The differential gear system referenced by 1 in FIGS. 6 and 7 is the main drive gear. The feedback operation starts from another differential gear system referenced by 2.

d. Because the feed back unit is designed to guide the torque from gear L to the first differential gear 1 to the input end of the first differential gear 1 by means of the application of a small torque, the torque at the input end of gear L of the other differential gear systems of the feed back unit must be greater than the input torque of gear R and gear D, except for the third differential gear 3 in FIG. 6 and the differential gear 5 in FIG. 7.

e. For ease of understanding, the value of torque at the driving end of each gear is respectively represented by a whole number. The smallest torque is represented by "1". According to the aforesaid torque multiplying principle, the value of torque at the driving end of each gear is a 2's index value ($2^0, 2^1, 2^2, 2^{3*}$). Therefore, the characteristic of the differential gear system can be well understood from the value of torque ratios shown in FIGS. 6 and 7.

f. FIG. 6 illustrates a feed back characteristic designed subject to the procedures of a. It is amplified once only, i.e., it passes through the procedures of a-3 and a-4 once only. The minimum value of torque is at the location where induced torque is input and the action of multiplying torque is started, i.e., gear R of the second differential gear system 2. Assume the input induced torque at gear R of the second differential gear system 2 is one unit of torque. Then, one equal unit of torque must be input to gear L of the second differential gear system 2, enabling gear D of the second differential gear system 2 to receive two units of torque. The two-units of torque are input to gear D of the third differential gear system 3 to operate with the input end of gear L of the third differential gear system 3 to produce a torque multiplying action, enabling the R end of the third differential gear system 3 to receive 4 units of torque. Because the rotational speed at R of the third differential gear system 3 is equal to the input end of the first differential gear system 1, a converter Z can be used to feed back torque to the input end of the differential gear system 1.

g. From the inference of procedures a-6, it is obtained that the output torque at gear L of the first differential gear system 1 is 1+2=3 units of torque. From the principle of force couples, it is understood that the output torque at gear D of the first differential gear system 1 is 3 units. When one unit of inducing torque is added, the input torque at the input end is 7 units.

h. From the inference of procedure a-7, it is known that the power to be transmitted by the converter in one feed back cycle is 4/7 of the input power. This 4/7 input power must be repeated through an unlimited number of feed back cycles. Therefore, the total power to be transmitted by the converter is:

$$4/7+(4/7)^2+(4/7)^3+ \ldots +(4/7)^n=4/3 \text{ input power}$$

i. FIG. 7 illustrates a feed back characteristic designed subject to the procedures of a. The system of FIG. 7 is amplified twice, i.e., it passes through the procedures of a-3 and a-4 twice. The difference between the feed back cycle of this arrangement and that which is shown in FIG. 6, is that the amplified value of the feed back torque shown in FIG. 7 is greater than that which is shown in FIG. 6, i.e., the arrangement shown in FIG. 7 reaches 16 times the inducing torque. According to this arrangement, the power to be transmitted by the converter in one cycle is 16/31 of the input power. The total power to be transmitted by the converter is:

$$16/31+(16/31)^2+(16/31)^3+ \ldots +(16/31)^n=16/15 \text{ input power.}$$

In a N-layer feedback multiplication mechanism, the multiplication value of feed back torque to the inducing torque is: $2^{(2*n)}$, and the transmission power of the converter is:

$$\left[\frac{2^{(2*N)}}{2*(2^0+\ldots+2^{(2*n-1)})+1}\right]^1 + \left[\frac{2^{(2*N)}}{2*(2^0+\ldots+2^{(2*N-1)})+1}\right]^2 + \ldots + \left[\frac{2^{(2*N)}}{2*(2^0+\ldots+2^{(2*N-1)})+1}\right]^\infty$$

The scope and characteristics of the present invention will be fully understood from the following examples with reference to the annexed drawings.

Because the mechanism can automatically determine the minimum torque required for the desired output power, and because controlling the transmission power of the converter determines power input amount allowable at the point input end, the mechanism of the present invention can be used in any situation where power, torque, or speed is to be changed. For example, the present invention can be used instead of a frequency converter or vehicle speed changer.

1. To Substitute for a Frequency Converter

The basic structure shown in FIG. 6 can be used for explaining the present invention's use in place of a frequency converter. The "input" of the gear type automated torque converter is connected to power source (normally the motor), the "output" is connected to the equipment being driven. The method of changing the loading is to change the transmission power of the converter. The simplest structure of the converter is similar to an inductor motor. Changing the induction area or magnetic flux amount of the induced part (for example the winding) can change the magnetic inductance value, and therefore the power transmission amount of the converter can be relatively changed. According to the rules of design indicated in a for item 2, the "feed back unit", the torque distribution ratio at every transmission point is fixed, as shown in FIG. 6, when in a dynamic balance. Therefore, when the power at either transmission point is fixed to an upper limit, the input power will have an upper limit. Thus, power control is achieved. The transmission point that can most easily be controlled is the "converter". Therefore, the power input amount at the input end can be changed by changing the power transmission amount of the converter, and the desired speed change at the output end can be achieved by means of the particular arrangement of the mechanism being capable of automatically making a change subject to the resistance at the output end.

2. Vehicle Speed Changer

The basic structure shown in FIG. 6 is used again for explanation. The method to achieve the performance requirements for currently used motor vehicles is simpler than that of a frequency converter. All automatic gear shifting motor vehicles commonly have a converter that fits the performance of the engine. Using the present invention to substitute for the speed change gear enables the transmission system of the motor vehicle to form a non-stepped speed changing system. It enables the transmission system to automatically change the amount of torque at the output end subject to the amount of external resistance. Because the output value of torque at the input end does not change with the variation of resistance at the output end, the invention achieves a non-stepped speed change operation, and prolongs the service life of the engine. Because the design of an engine need not take into consideration the performance at different gear shifting positions, the manufacturing of the engine is simplified, and engine manufacturing cost is greatly reduced.

It is to be understood that the drawings are designed for purposes of illustration only, and are not intended as a definition of the limits and scope of the invention disclosed.

What is claimed is:

1. A gear type automated torque converter comprising:

a torque changing main unit formed of a drive gear set to receive input power, said drive gear set including a first differential gear system, a left gear on a left side of said first differential gear system, and a right gear on a right side of said first differential gear system; and, a feedback gear mechanism, said feedback gear mechanism including a plurality of feedback gear sets arranged to provide force couples, one of said feedback gear sets including a second differential gear system, a left gear on a left side of said second differential gear system, and a right gear on a right side of said second differential gear system, a rotational output speed of said feedback gear mechanism and a rotational input speed of said torque changing main unit being equal to enable power at said feedback gear mechanism to be fed back to said torque changing main unit through a converter, said feedback unit being induced to feed back power to said torque changing main unit when an input end of said torque changing main unit outputs 1/7 of total output power thereto.

2. A gear type automated torque converter comprising:

a torque changing main unit formed of a drive gear set to receive input power, said drive gear set including a first differential gear system, a left gear on a left side of said first differential gear system, and a right gear on a right side of said first differential gear system; and, a feedback gear mechanism, said feedback gear mechanism including a plurality of feedback gear sets arranged to provide force couples, one of said feedback gear sets including a second differential gear system, a left gear on a left side of said second differential gear system, and a right gear on a right side of said second differential gear system, a rotational output speed of said feedback gear mechanism and a rotational input speed of said torque changing main unit being equal to enable power at said feedback gear mechanism to be fed back to said torque changing main unit through a converter, the other feedback gear sets also each including a differential gear system, said differential gear systems of said feedback gear sets each being formed of two levels of gear sets alternately arranged together, enabling said feedback unit to be induced to feed back power to said torque changing main unit when an input end of said torque changing main unit outputs 1/31 of total output power thereto.

3. A gear type automated torque converter comprising:

a torque changing main unit formed of a drive gear set to receive input power, said drive gear set including a first differential gear system, a left gear on a left side of said first differential gear system, and a right gear on a right side of said first differential gear system; and, a feedback gear mechanism, said feedback gear mechanism including a plurality of feedback gear sets arranged to provide force couples, one of said feedback gear sets including a second differential gear system, a left gear on a left side of said second differential gear system, and a right gear on a right side of said second differential gear system, a rotational output speed of said feedback gear mechanism and a rotational input speed of said torque changing main unit being equal to enable power at said feedback gear mechanism to be fed back to said torque changing main unit through a converter, wherein when two different torques are applied to said second differential gear system of said feedback gear mechanism, an output thereof is equal to that of a smaller torque of the two torques.

4. A gear type automated torque converter comprising:

a torque changing main unit formed of a drive gear set to receive input power, said drive gear set including a first differential gear system, a left gear on a left side of said first differential gear system, and a right gear on a right side of said first differential gear system; and, a feedback gear mechanism, said feedback gear mechanism including a plurality of feedback gear sets arranged to provide force couples, one of said feedback gear sets including a second differential gear system, a left gear on a left side of said second differential gear system, and a right gear on a right side of said second differential gear system, a rotational output speed of said feedback gear mechanism and a rotational input speed of said torque changing main unit being equal to enable power at said feedback gear mechanism to be fed back to said torque changing main unit through a converter, wherein when two torques are input to any two gears of one of the a differential gear systems of said feedback gear mechanism, a third gear of said one differential gear system outputs a torque which is twice the magnitude of a smaller of said two input torques.

* * * * *